Sept. 19, 1961  H. B. BARRETT  3,000,242
RIVETING MACHINE

Filed March 8, 1957  3 Sheets-Sheet 1

INVENTOR.
HARRY B. BARRETT
BY
ATTORNEY

Sept. 19, 1961 H. B. BARRETT 3,000,242
RIVETING MACHINE
Filed March 8, 1957 3 Sheets-Sheet 2
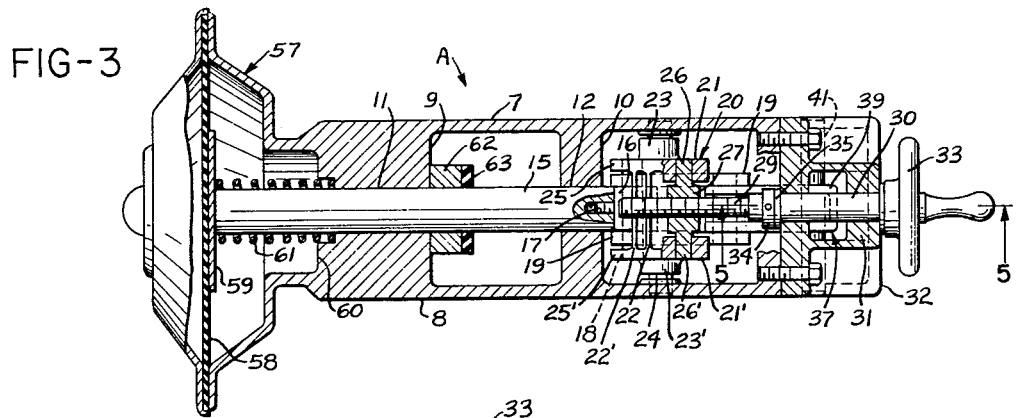
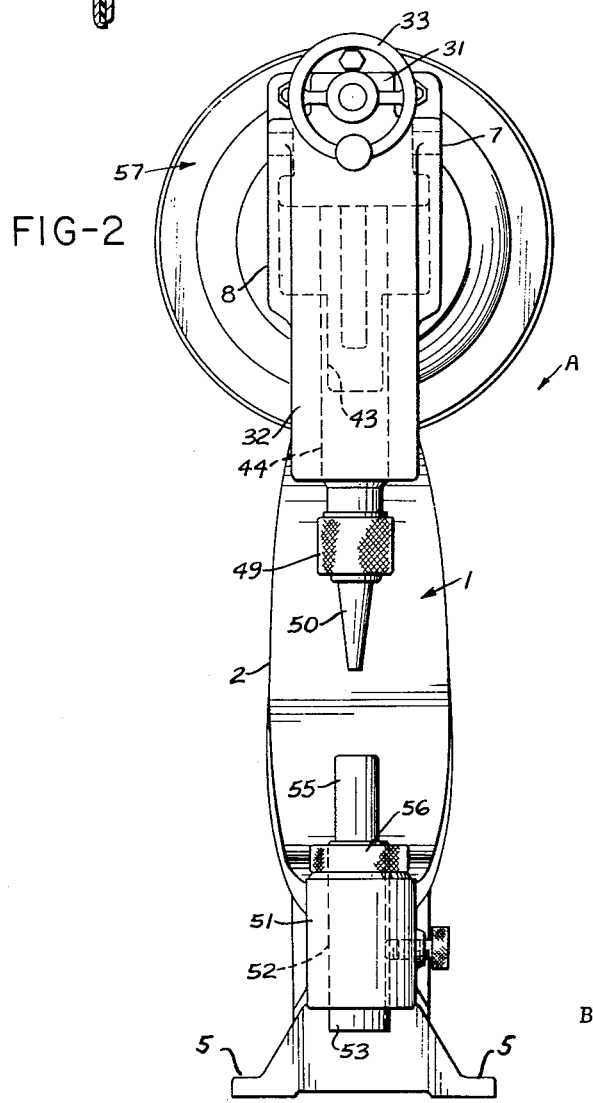
INVENTOR.
HARRY B. BARRETT
BY
ATTORNEY Sept. 19, 1961 H. B. BARRETT 3,000,242
RIVETING MACHINE
Filed March 8, 1957 3 Sheets-Sheet 3
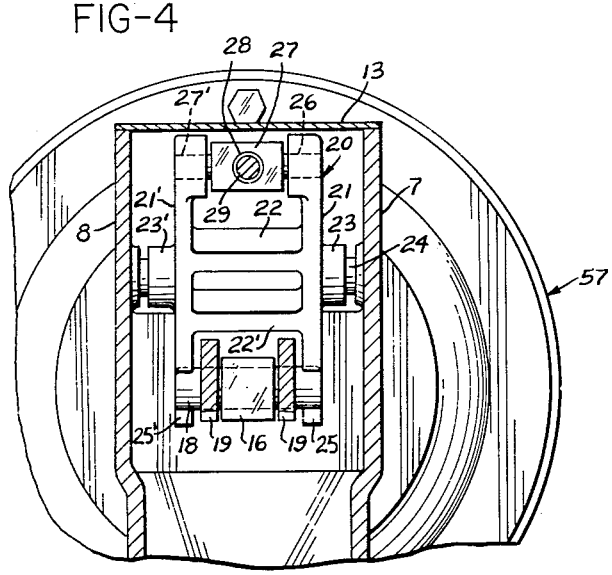
FIG-4
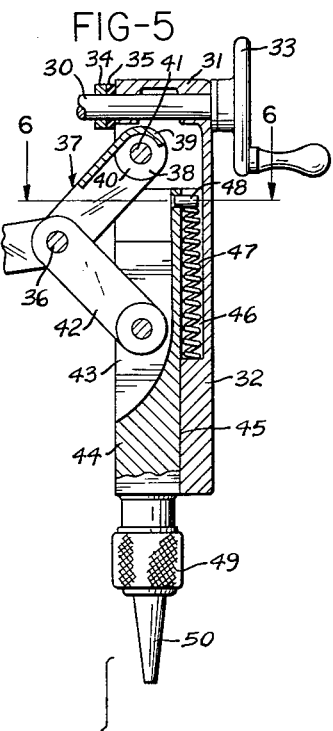
FIG-5
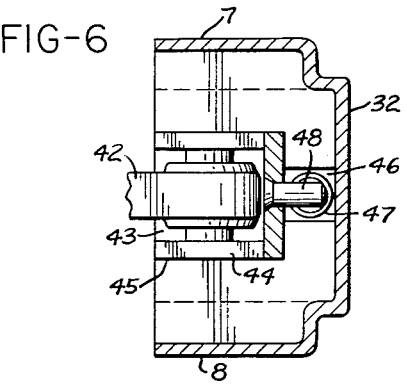
FIG-6
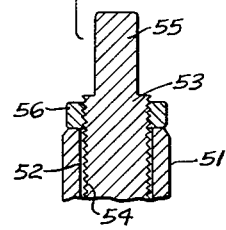
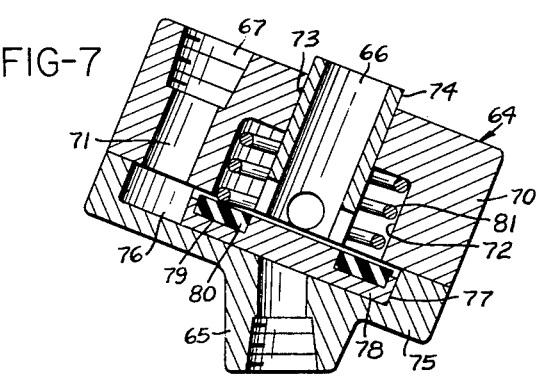
FIG-7
INVENTOR.
HARRY B. BARRETT
BY
ATTORNEY

United States Patent Office 3,000,242
Patented Sept. 19, 1961

3,000,242
RIVETING MACHINE
Harry B. Barrett, Clayton, Mo.
(18 S. Kingshighway, St. Louis 8, Mo.)
Filed Mar. 8, 1957, Ser. No. 644,859
8 Claims. (Cl. 78—41)

This invention relates in general to riveting machines and, more particularly, to a machine adapted for riveting brake lining to brake shoes and for performing similar industrial riveting operations.

In performing various industrial riveting operations it is desirable to employ a power-driven machine but such operations usually present inherent problems of a special nature which have heretofore made it impossible to utilize conventional equipment. For example, in the automotive brake field it is quite customary to rivet the brake lining to the brake shoe. The arcuate segment of brake lining, which is formed of antifriction materials, is usually provided with a plurality of countersunk rivet-holes for receiving rivets by which the lining is securely attached to the shoe. Since brake lining materials are relatively soft, as compared with the metal of the shoe and the metal of the rivet, the riveting of a piece of lining upon a brake shoe has always presented a rather critical problem. If the mechanic in upsetting or peening over the rivet applies insufficient force so that the rivet is not drawn down as tightly as it should be, the brake lining will be insecurely held and will eventually work loose. On the other hand, if the mechanic applies too much force or, in other words, peens over too much of the rivet so as to draw the head down too tightly into the countersunk rivet-hole, the rivet head may crack or break through the lining. Either defect will cause the automotive brake to malfunction. Therefore, it is essential that each rivet must be upset or peened over to the right degree within rather close limits of dimensional tolerance. With hand-powered tools it is possible for a highly-skilled and careful mechanic to develop a satisfactory technique, but quite frequently automobile brake repair shops cannot find adequately skilled and sufficiently painstaking mechanics for this type of work. Furthermore, since brake riveting operations have conventionally been carried out through the use of hand-powered or foot-powered tools, the procedure is relatively time consuming, tiring, and expensive. Problems of a similar nature arise in other industrial applications.

It is, therefore, the primary object of the present invention to provide a power-driven machine for riveting brake lining and performing similar industrial riveting operations, which machine reduces to a minimum the amount of physical effort which must be expended by the mechanic or operator.

It is also one of the primary objects of the present invention to provide a power-actuated riveting machine of the type stated in which the riveting stroke can be precisely adjusted to take into account the length of the rivet and other related factors of the particular riveting operation being performed.

It is a further object of the present invention to provide a riveting machine of the type stated which is pneumatically operated and is capable of performing brake-shoe riveting operations rapidly without damage to either the rivet or to the parts being riveted together.

It is an additional object of the present invention to provide a riveting machine which can be quickly operated by the average workman without a high degree of antecedent training or skill.

It is also one of the more specific objects of the present invention to provide a power-actuated brake-shoe riveter in which the riveting stroke can be precisely adjusted to take into account the length of the rivet and the residual amount of the lining disposed between the rivet head and the face of the brake shoe.

With the above and other objects in view, my invention resides in the novel features of form, construction, arrangement, and combination of parts presently described and pointed out in the claims.

In the accompanying drawings

FIG. 2 is a front elevational view of the brake-shoe riveter shown in FIG. 1;

FIG. 3 is a sectional view taken along line 3—3 of FIG. 1;

FIG. 4 is a fragmentary sectional view taken along line 4—4 of FIG. 1;

FIG. 5 is a fragmentary sectional view taken along line 5—5 of FIG. 3;

FIG. 6 is a fragmentary sectional view taken along line 6—6 of FIG.5; and

FIG. 7 is a sectional view of the air relief valve forming a part of the present invention.

Figure 1:
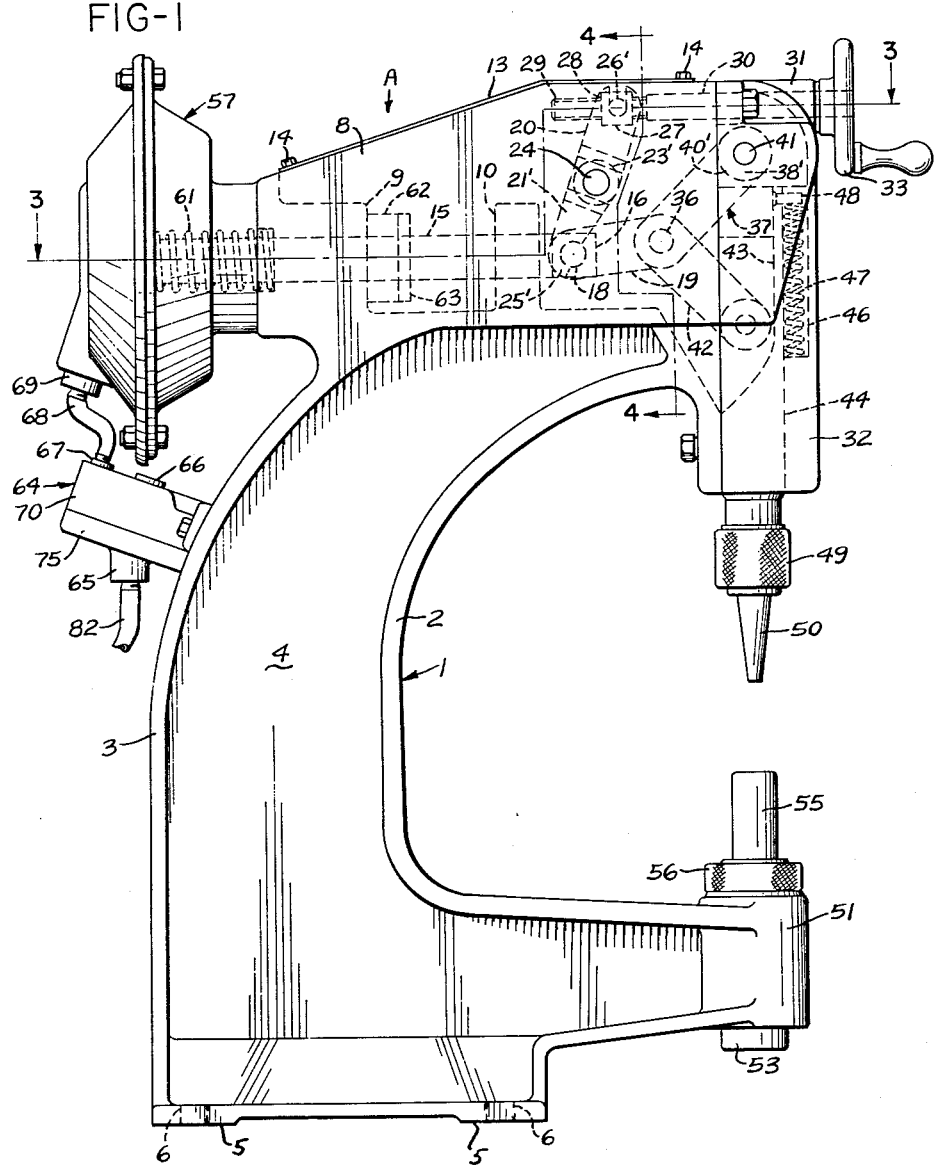
FIG. 1 is a brake-shoe riveter constructed in accordance with and embodying the present invention.

Referring now in more detail and by reference characters to the drawings, which illustrate a preferred embodiment of the present invention, A designates a riveter comprising a yoke-shaped frame 1 cast, forged or otherwise suitably fabricated in one piece and integrally including front and rear flanges 2, 3, connected by a central web 4. At its lower end the frame 1 is integrally provided with oppositely projecting horizontal ears 5 and apertures 6 through which the riveter A can be conventionally bolted to a suitable work bench, stand, or other supporting structure (not shown).

At its upper end the frame 1 is transversely enlarged and elongated in the provision of an upwardly opening box-like structure integrally including spaced parallel side walls 7, 8, transversely connected by integral partition-like cross members 9, 10, which are provided centrally with coaxial apertures 11, 12, respectively. The upper margins of the side walls 7, 8, are angularly contoured, as best seen in FIG. 1, and are transversely aligned or registered for receiving a companion-shaped sheet metal cover plate 13 removably held in place by means of short bolts 14.

Slidably mounted in and extending through the apertures 11, 12, is a push rod 15 which is provided at its forward end with a rectangular head-block 16 held in place by a threaded stud 17. Rotatably mounted in and extending through the head-block 16 is a horizontal pivot pin 18, and rockably mounted on the outwardly projecting ends thereof on opposite sides of the head-block 16 are parallel links 19.

Provided for cooperation with the pivot pin 18 is an adjustment yoke 20 integrally including two spaced parallel side links 21, 21', unitarily connected by vertically spaced parallel cross webs 22, 22'. The links 21, 21', are centrally provided with laterally aligned coaxially bored bosses 23, 23', which, in turn, are rockably disposed around a cross pin 24 mounted at its ends in and extending horizontally between the side walls 7, 8. At their lower ends the side links 21, 21', are formed with semi-circular hook-like fingers 25, 25', respectively, located outwardly on either side of the links 19 and adapted for loose-fitting engagement with the outwardly projecting ends of the pivot pin 18, all as best seen in FIGS. 1 and 4, and for purposes presently more fully appearing. At their upper ends the side links 21, 21', are longitudinally slotted for rockably and shiftably accommodating the outwardly projecting pin-like ends 26, 26', of a swivel fitting 27, which is centrally provided with an internally threaded bore 28, the axis of which is perpendicular to the longitudinal axis of the pin-like ends 26, 26', and is operatively mounted in the manner of a feed nut upon an adjusting screw 29 having a diametrally enlarged, smooth surfaced or rod-like forward end 30 which is journaled in a boss 31 formed integrally upon the upper end of a vertically elongated head-casting 32 which is, in turn, bolted across the forwardly presented face of the upper end of the frame 1. The rod-like forward end 30 of the adjusting screw 29 projects outwardly from the head-casting 32, and on such projecting end is rigidly provided a conventional hand-wheel 33. On that portion of its length which is adjacent to the inner face of the head-casting 32, the rod-like end portion 30 of the adjusting screw 29 is provided with a set collar 34 and a thrust collar 35 which is interposed between the set collar 34 and the inner face of the head-casting 32 to absorb any axial thrust as the swivel fitting 27 traverses to and fro along the adjustment screw responsive to turning movement of the adjustment screw 29.

Mounted in and extending transversely between the forward ends of the links 19 is a pin 36 which rockably supports the lower ends of an upwardly inclined first toggle link 37 having spaced parallel legs 38, 38', integrally connected at their upper ends by a transverse bight 39. Adjacent their upper ends the legs 38, 38', are provided with transversely aligned coaxially bored bosses 40, 40', and disposed bearing-wise through the bosses 40, 40', is a stationary horizontal pivot pin 41 which is secured at its ends in the side portions of the head-casting 32. Similarly secured at its upper end to the pin 36 and extending angularly downwardly therefrom is a second toggle link 42 which is relatively wide and is located between the legs 38, 38', of the first toggle link. At its lower end the toggle link 42 projects loosely into and is pivotally secured within a vertical clearance slot 43 formed in the upper end of a vertical plunger 44 which is, in turn, shiftably mounted in and projects downwardly from a vertical slideway 45 milled or otherwise suitably machined in the lower portion of the head-casting 32. Also milled in the lower portion of the head-casting 32 forwardly of the slideway 45 and opening rearwardly thereto is a recess 46 having a vertically disposed compression spring 47 which bears at its lower end upon the bottom wall of the recess 46 and at its upper end against a horizontal pin 48 fixed securely in the upper end of the plunger 44.

At its lower end the plunger 44 is provided with a conventional chuck 49 for manually releasable engagement with a riveting tool 50. It should be understood in this connection that the riveting tool 50, as shown in the drawings, is of one selected size and shape but that other interchangeable riveting tools of different size and shape may be used as needed for particular types of work, the selection or choice of a particular riveting tool for a particular riveting operation being a matter which is well understood by the ordinary skilled mechanic.

Formed on the frame 1 in downwardly spaced relation to the chuck 49 is an anvil-boss 51 provided with an aperture 52 for receiving a cylindrical stud 53 provided on its outer surface with threads 54 and on its upper end with a rivet seat 55. Provided for engagement with the threads 54 is an adjusting collar 56, whereby the cylindrical stud 53 and rivet seat 55 may be shifted upwardly or downwardly.

On its upper rear side the frame 1 is provided with a hollow diaphragm housing 57 which supports a flexible rubber-like diaphragm 58. Positioned for flat facewise contact with the diaphragm 58 is a backing plate 59 which, in turn, is secured to the rear end of the push rod 15. Interposed between the backing plate 59 and a shoulder 60 formed on the cross member 9 is a compression coil spring 61 which normally urges the rod 15 to the left (reference being made to FIG. 3). Rigidly secured to the push rod 15 adjacent the cross member 9 is a stop collar 62, and similarly secured to the push rod 15 adjacent the stop collar 62 is a rubber-like thrust washer 63. Bolted to the rear face of the frame 1 in downwardly spaced relation to the housing 57 is an air valve 64 provided with an inlet port 65, an exhaust port 66, and an outlet port 67, the latter being connected through an air line 68 to an intake port 69 on the diaphragm housing 57. As seen by reference to FIG. 7, the air valve 64 includes a valve-body 70 provided with an air passage 71 which communicates with the outlet port 67. Also formed on the valve-body 70 in spaced relationship to the air passage 71 is a recess 72 terminating in a bore 73 which supports a hollow tubular sleeve 74, the latter projecting into the recess 72. Bolted to the valve-body 70 is a cover casting 75 provided with a recess 76 having a lower cylindrical portion 77 for slidably receiving a disk 78 having an annular groove 79 for snug-fitting reception of a rubber-like sealing gasket 80. Seated within the recess 72 and encircling the tubular sleeve 74 is a coil spring 81 which bears against the disk 78 and normally urges the sealing gasket 80 away from the recess 72. Connected to the inlet port 65 is an air intake line 82 which is, in turn, connected through a suitable foot control valve and source of compressed air (not shown).

It will, of course, be evident from the foregoing description and the drawings that, whenever compressed air under pressure is admitted through a conventional foot valve or other control mechanism to the line 82, the disk 78 of the air valve 64 will be shifted from the position shown in FIG. 7 to a position in which the gasket 80 is seated closurewise across the recess 72 closing the outlet port 66 and consequently the compressed air will flow through the outlet passage 71 and through the line 68 to the diaphragm housing 57 and will exert pressure against the rearward face of the diaphragm 58 urging the push rod 15 forwardly, that is to say, to the right as viewed in FIG. 1. The forward movement of the push rod 15 will be transmitted through the parallel links 19 to the toggle links 37, 42, through the pin 36. Since the upper end of the toggle link 37 is limited to rocking movement by the horizontal pivot pin 41, this forward movement of the pin 36 will be translated into downward vertical movement imposed upon the plunger 44, which will, in turn, shift the riveting tool 50 downwardly in a riveting stroke. It should be noted in this connection that as the plunger rod 15 moves forwardly, the pivot pin 18 will also move forwardly out of engagement with the semi-circular hook-like fingers 25, 25', of the adjustment yoke 20 and the distance of such forward movement will, of course, be directly related to the length of stroke of the plunger 44. Thus, the length of stroke of the plunger 44 can be adjusted within the limits for which the riveter A is designed by turning the handwheel 33, thereby shifting the swivel fitting 27 to or fro to any desired position. This shifting movement of the swivel fitting 27 will, in turn, rock the adjustment yoke 20 so that the hook-like fingers 25, 25', will be located in any one of several selected positions and the initial position of the pivot pin 18 and riveting tool 50 will thereby be established. It will, therefore, be apparent that the initial position of the riveting tool 50 can be readily established for movement from such initial position to a fixed final position. Since the push rod 15 is biased rearwardly by the spring 61, the rearwardmost position of the pivot pin 18 can be thus readily adjusted. By rocking the adjustment yoke 20 so that the hook-like fingers 25, 25', will assume a position forwardly from the rearmost position, it is possible to shorten the stroke of the vertical plunger 44.

Since the rivet seat 55 can be adjusted upwardly and downwardly by means of the adjusting collar 56 and the length of stroke of the vertical plunger 44 can be adjusted in the manner above described, the riveter A is thus capable of accommodating rivets of various different lengths and upsetting these rivets to a greater or lesser degree. In other words, the amount of stroke and the amount of riveting pressure are both adjustable. For example, if a rivet is to be used which has an initial or original length of one-half inch, the position of the rivet seat 55 and the length of stroke of the plunger 44 can be relatively adjusted so that at the completion of the riveting stroke, the distance between rivet seat 55 and the riveting face of the riveting tool 50 will be any desired distance apart. Therefore, if the adjustment is made so that the distance at the end of the stroke is $7/16$ of an inch, the rivet will be upset to the extent of $1/16$ of an inch. Similarly, if it is desired to upset the rivet $1/4$ of an inch so that the distance between the head and upset portion is likewise $1/4$ of an inch, then the rivet seat 55 and length of stroke may be adjusted to effect this result. Once the riveter A has been adjusted, it will continue to upset rivets in exactly the same manner with speed, accuracy, and precision.

After each riveting stroke has been completed, the riveter will be returned to initial position through operation of the springs 47, 61. Since the flow of compressed air through the intake line 82 has ceased as a result of the conventional operation of the foot valve or other similar control mechanism, the pressure within the diaphragm housing 57 will drop and the spring 81 will force the disk 78 back to the position shown in FIG. 7, thereby opening the exhaust port 66 so that the air which is trapped within the diaphragm housing 57 may be quickly expelled and the springs 47, 61, can effect a rapid return of the plunger 44.

It should be understood that changes and modifications in the form, construction, arrangement, and combination of the several parts of the riveting machines may be made and substituted for those herein shown and described without departing from the nature and principle of my invention.

Having thus described my invention, what I claim and desire to secure by Letters Patent is:

1. An adjustable slide mechanism comprising a housing having a push-rod slidably mounted thereon, a plunger movable with respect to the housing and through a straight path from any one of a plurality of initial positions to a fixed final position, toggle link means operatively connected to said push-rod and plunger, a yoke rockably mounted on the housing and cooperating with the push-rod for setting said plunger at any one of the initial positions, means for moving said push-rod whereby to drive said plunger from the initial to the final position, and spring means for returning the plunger to its initial position.

2. A riveting machine comprising a housing having a push-rod slidably mounted thereon, a plunger having a tool mounted thereon, said plunger and tool being movable with respect to the housing and through a straight path from any one of a plurality of initial positions to a fixed final position, toggle link means operatively connected to said push-rod and plunger, a yoke rockably mounted on the housing and cooperating with the push-rod for setting said tool at any one of the initial positions, power operated means for moving said push-rod whereby to drive said tool from the initial to the final position, and spring means for returning the tool to its initial position.

3. An adjustable slide mechanism comprising a housing having a push-rod slidably mounted thereon, a plunger mounted within said housing for movement through a straight path, first and second toggle links, link means operatively connected at one end to the push-rod and at the other end to one end of said first and second toggle links, the other end of said first toggle link being pivotally secured to the housing, the other end of said second toggle link being pivotally secured to the plunger, means on said housing cooperating with said push-rod for moving said plunger to an initial selected position, means for moving said push-rod whereby to drive said plunger from its initial selected position through said straight line path, and means for returning said plunger to its initial position.

4. A riveting machine comprising a base having a push-rod slidably mounted thereon, a front member secured to the base and being provided with a plunger slidably mounted therein for movement through a straight path, said plunger being provided with a tool movable therewith, link means operatively connected at one end to the push-rod and at the other end to one end of first and second toggle links, the other end of said first toggle link being pivotally secured to the front member, the other end of said second toggle link being pivotally secured to the plunger, a yoke rockably mounted on the housing and cooperating with the push-rod for moving said push-rod and plunger to an initial selected position, means for moving said push-rod whereby to drive said plunger from its initial selected position through said straight line path, spring means for returning the push-rod to its initial position, and spring means in said front member for returning the plunger to its initial position.

5. A riveting machine comprising a base having a push-rod slidably mounted thereon, a front member secured to the base and being provided with a plunger slidably mounted therein for movement through a straight path, said plunger being provided with a tool movable therewith, link means operatively connected at one end to the push-rod and at the other end to one end of first and second toggle links, the other end of said first toggle link being pivotally secured to the front member, the other end of said second toggle link being pivotally secured to the plunger, a yoke rockably mounted on the housing and provided with finger means operatively connected to one end of the push-rod, means for actuating the other end of the yoke thereby moving said push-rod and plunger to an initial selected position, means for moving said push-rod whereby to drive said plunger from its initial selected position through said straight line path, spring means for returning the push-rod to its initial position, and spring means in said front member for returning the plunger to its initial position.

6. A riveting machine comprising a base having a push-rod slidably mounted thereon, a diaphragm operatively connected to one end of said push-rod, a front member secured to the base and being provided with a plunger slidably mounted therein for movement through a straight path, said plunger being provided with a tool movable therewith, link means operatively connected at one end to the push-rod and at the other end to one end of first and second toggle links, the other end of said first toggle link being pivotally secured to the front member, the other end of said second toggle link being pivotally secured to the plunger, a yoke rockably mounted on the housing and provided with finger means operatively connected to one end of the push-rod, means for actuating the other end of the yoke thereby moving said push-rod and plunger to an initial selected position, means for admitting fluid to said diaphragm whereby to move said push-rod and drive said plunger from its initial selected position through said straight line path, spring means for returning the push-rod to its initial position, and spring means in said front member for returning the plunger to its initial position.

7. A riveting machine comprising a base having a push-rod slidably mounted thereon, a diaphragm operatively connected to one end of said push-rod, a front member secured to the base and being provided with a slot having a plunger slidably mounted therein for movement through a straight path, said plunger being provided at its lower end with a tool movable therewith, link means operatively connected at one end to the push-rod and at the other end to one end of first and second toggle links, the other end of said first toggle link being pivotally secured to the front member, the other end of said second toggle link being pivotally secured to the plunger, a yoke rockably mounted on the housing and provided with finger means operatively connected to one end of the push-rod, means for actuating the other end of the yoke thereby moving said push-rod and plunger to an initial selected position, means for admitting fluid to said diaphragm whereby to move said push-rod and drive said plunger from its initial selected position through said straight line path, spring means for returning the push-rod to its initial position, and spring means in said front member for returning the plunger to its initial position.

8. An adjustable slide mechanism comprising a housing having a push-rod slidably mounted thereon, a plunger mounted in said housing for longitudinal movement with respect thereto through a straight path from any one of a plurality of initial positions to a fixed final position, toggle link means connected between the inner end of the plunger and the housing, an auxiliary link pivotally connected to the toggle link means and extending laterally outwardly therefrom, said auxiliary link means being rockably connected to the push-rod, a lever rockably mounted in the housing and operatively connected at one end to the push-rod, adjustment means operatively connected to the other end of the lever for rocking the lever into various positions around its pivot and thereby shifting the push-rod and the plunger into any one of several initial positions, means for forcibly shifting the push-rod whereby to drive the plunger from the initial to the final position, and resilient means for returning the plunger to said initial position.

References Cited in the file of this patent

UNITED STATES PATENTS

| | | |
|---|---|---|
| 377,858 | Lawrence | Feb. 14, 1888 |
| 500,755 | Courtet | July 4, 1893 |
| 580,771 | Caskey | Apr. 13, 1897 |
| 1,144,297 | Chaplin | June 22, 1915 |
| 1,382,293 | Kennedy | June 21, 1921 |
| 1,796,763 | Patterson | Mar. 17, 1931 |
| 1,840,389 | Eubank | Jan. 12, 1932 |
| 1,843,935 | Stevens | Feb. 9, 1932 |
| 2,054,428 | Klocke | Sept. 15, 1936 |
| 2,844,978 | Wyland | July 29, 1958 |